United States Patent
Wood et al.

(10) Patent No.: US 9,979,300 B1
(45) Date of Patent: May 22, 2018

(54) ENHANCING PEAK POWER CAPABILITY AND HOLD UP TIME IN LLC TOPOLOGY APPLICATION

(71) Applicant: Dell Products L.P., Round Rock, TX (US)

(72) Inventors: Merle Wood, Round Rock, TX (US); Wei-Cheng Yu, New Taipei (TW); Tun-Chieh Liang, Taipei (TW); Tsung-Cheng Liao, Taoyuan (TW); Wen-Yung Chang, Jhong Li (TW)

(73) Assignee: Dell Products L.P., Round Rock, TX (US)

( * ) Notice: Subject to any disclaimer, the term of this patent is extended or adjusted under 35 U.S.C. 154(b) by 0 days. days.

(21) Appl. No.: 15/417,498

(22) Filed: Jan. 27, 2017

(51) Int. Cl.
| H02M 3/335 | (2006.01) |
| H02M 1/00 | (2006.01) |
| H02M 7/757 | (2006.01) |
| H02M 5/42 | (2006.01) |
| H02M 7/68 | (2006.01) |
| H02M 3/24 | (2006.01) |
| H02M 7/44 | (2006.01) |
| H02M 1/44 | (2007.01) |

(52) U.S. Cl.
CPC ......... H02M 3/33507 (2013.01); H02M 1/44 (2013.01)

(58) Field of Classification Search
CPC ....... H02M 1/4241; H02M 2007/4815; H02M 2007/4818
USPC ................. 363/21.02, 21.03, 78, 79, 97, 98
See application file for complete search history.

(56) References Cited

U.S. PATENT DOCUMENTS

| 8,513,926 B2 * | 8/2013 | Park ......................... G05F 1/70 323/207 |
| 2013/0279205 A1 * | 10/2013 | Keung ............... H02M 3/33507 363/21.02 |
| 2015/0054421 A1 * | 2/2015 | Auer .................. H05B 33/0809 315/247 |

\* cited by examiner

*Primary Examiner* — Gary Nash
(74) *Attorney, Agent, or Firm* — Baker Botts L.L.P.

(57) ABSTRACT

Systems and methods for enhancing peak power capability and hold-up time in a resonant converter having a LLC topology may include a couple choke transformer circuit that may control an inductance of the couple choke transformer circuit and improve power efficiency of the resonant converter. The resonant converter may also include a resonant tank circuit that may provide improved peak power delivery of the resonant converter. The resonant converter may further include a resonant tank control circuit to control the resonant tank circuit and may increase the peak gain of the resonant converter, increase a voltage range of the input voltage, and extend a hold-up time of the input voltage when an AC power failure occurs.

18 Claims, 7 Drawing Sheets

$$V_{in}^{min} = \sqrt{V_{O,PFC}^2 - \frac{2P_{in}T_{HU}}{C_{DL}}}$$
506

ENHANCING PEAK POWER CAPABILITY AND HOLD UP TIME IN LLC TOPOLOGY APPLICATION

BACKGROUND

Field of the Disclosure

This disclosure relates generally to information handling systems and, more particularly, to a narrow border plastic cover for an information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include a variety of hardware and/or software components that may be configured to process, store, and/or communicate information. Information handling systems may also include one or more power supplies to power one or more other devices in the information handling system. Resonant based converters may be utilized, for example, to increase switching frequency, reduce the size of the one or more power supplies while maintaining efficiency of the one or more power supplies suitable for use by other components (e.g., a processor or a memory) within the information handling system.

SUMMARY

In one aspect, a disclosed a resonant converter may include a couple choke transformer circuit including a couple choke transformer including a primary side and a secondary side, the primary side coupled to a voltage input, and the secondary side coupled between a resistor and ground. The couple choke transformer circuit may include a diode coupled to the resistor, and a rectifier coupled between the diode and ground, the couple choke transformer circuit to control an inductance of the couple choke transformer. The resonant converter may also include a resonant tank circuit including a leakage inductor coupled to the primary side of the couple choke transformer, a magnetizing inductance transformer coupled to the leakage inductor, and a capacitor coupled between the magnetizing inductance transformer and ground, the resonant tank circuit to provide a peak gain of the resonant converter. The resonant converter may further include a resonant tank control circuit coupled to the voltage input of the couple choke transformer circuit via a second resistor, the resonant tank control circuit coupled to drive a control input of the rectifier to control the resonant tank circuit.

In any of the disclosed embodiments of the resonant converter, the resonant tank control circuit may also detect a change in an input voltage at the voltage input that indicates an alternating current (AC) power failure has occurred, and may drive the control input to turn on the rectifier to change the inductance of the couple choke transformer.

In any of the disclosed embodiments of the resonant converter, the couple choke transformer circuit further to, in response to the control input being driven to turn on the rectifier, the primary side of the couple choke transformer may be shorted to cause the inductance of the couple choke transformer to become a zero inductance value.

In any of the disclosed embodiments of the resonant converter, the couple choke transformer circuit further to, in response to the control input being driven to turn on the rectifier, the primary side of the couple choke transformer may be shorted by the rectifier, the diode and the resistor to cause the inductance of the couple choke transformer to become a zero inductance value.

In any of the disclosed embodiments of the resonant converter, the couple choke transformer circuit further to, in response to the control input being driven to turn on the rectifier, a peak gain of the resonant converter may be increased.

In any of the disclosed embodiments of the resonant converter, the couple choke transformer circuit further to, in response to the control input being driven to turn on the rectifier, a hold-up time of an input voltage at the voltage input may be increased.

In any of the disclosed embodiments of the resonant converter, the couple choke transformer circuit further to, in response to the control input being driven to turn on the rectifier, a voltage range of an input voltage at the voltage input may be increased.

In any of the disclosed embodiments of the resonant converter, the couple choke transformer circuit further to, in response to the control input being driven to turn off the rectifier, a peak gain of the resonant converter may be changed.

In any of the disclosed embodiments of the resonant converter, the resistor may provide a direct current (DC) bias current through the diode and the rectifier to limit a resonant current of the resonant tank circuit.

In another aspect, a disclosed method for enhancing peak power capability and hold-up time, in a resonant converter that may include a couple choke transformer circuit including a couple choke transformer including a primary side and a secondary side, the primary side coupled to a voltage input, and the secondary side coupled between a resistor and ground, a diode coupled to the resistor, and a rectifier coupled between the diode and ground. The resonant converter may also include a resonant tank circuit including a leakage inductor coupled to the primary side of the couple choke transformer, a magnetizing inductance transformer coupled to the leakage inductor, and a capacitor coupled between the magnetizing inductance transformer and ground. The resonant converter may further include a resonant tank control circuit coupled to the voltage input of the couple choke transformer circuit via a second resistor. The method may include controlling, by the couple choke transformer circuit, an inductance of the couple choke transformer. The method may also include providing, by the resonant tank circuit, a peak gain of the resonant converter. The method may further include driving, by the resonant tank control circuit, a control input of the rectifier to control the resonant tank circuit.

In any of the disclosed embodiments of the method, the method may also include detecting, by the resonant tank control circuit, a change in an input voltage at the voltage input that indicates an AC power failure has occurred, and driving the control input to turn on the rectifier that may change an inductance of the couple choke transformer.

In any of the disclosed embodiments of the method, the method may also include shorting, by the couple choke transformer circuit, in response to the control input being driven to turn on the rectifier, the primary side of the couple choke transformer that may cause the inductance of the couple choke transformer to become a zero inductance value.

In any of the disclosed embodiments of the method, the method may also include shorting, by the rectifier, the diode and the resistor, in response to the control input being driven to turn on the rectifier, the primary side of the couple choke transformer that may cause the inductance of the couple choke transformer to become a zero inductance value.

In any of the disclosed embodiments of the method, the method may also include increasing, in response to the control input being driven to turn on the rectifier, a peak gain of the resonant converter.

In any of the disclosed embodiments of the method, the method may also include increasing, in response to the control input being driven to turn on the rectifier, a hold-up time of an input voltage at the voltage input.

In any of the disclosed embodiments of the method, the method may also include increasing, in response to the control input being driven to turn on the rectifier, a voltage range of an input voltage at the voltage input.

In any of the disclosed embodiments of the method, the method may also include changing, in response to the control input being driven to turn off the rectifier, a peak gain of the resonant converter.

In any of the disclosed embodiments of the method, the method may also include providing, by the resistor, a DC bias current through the diode and the rectifier to limit a resonant current of the resonant tank circuit.

Other technical advantages will be apparent to those of ordinary skill in the art in view of the following specification, claims, and drawings.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
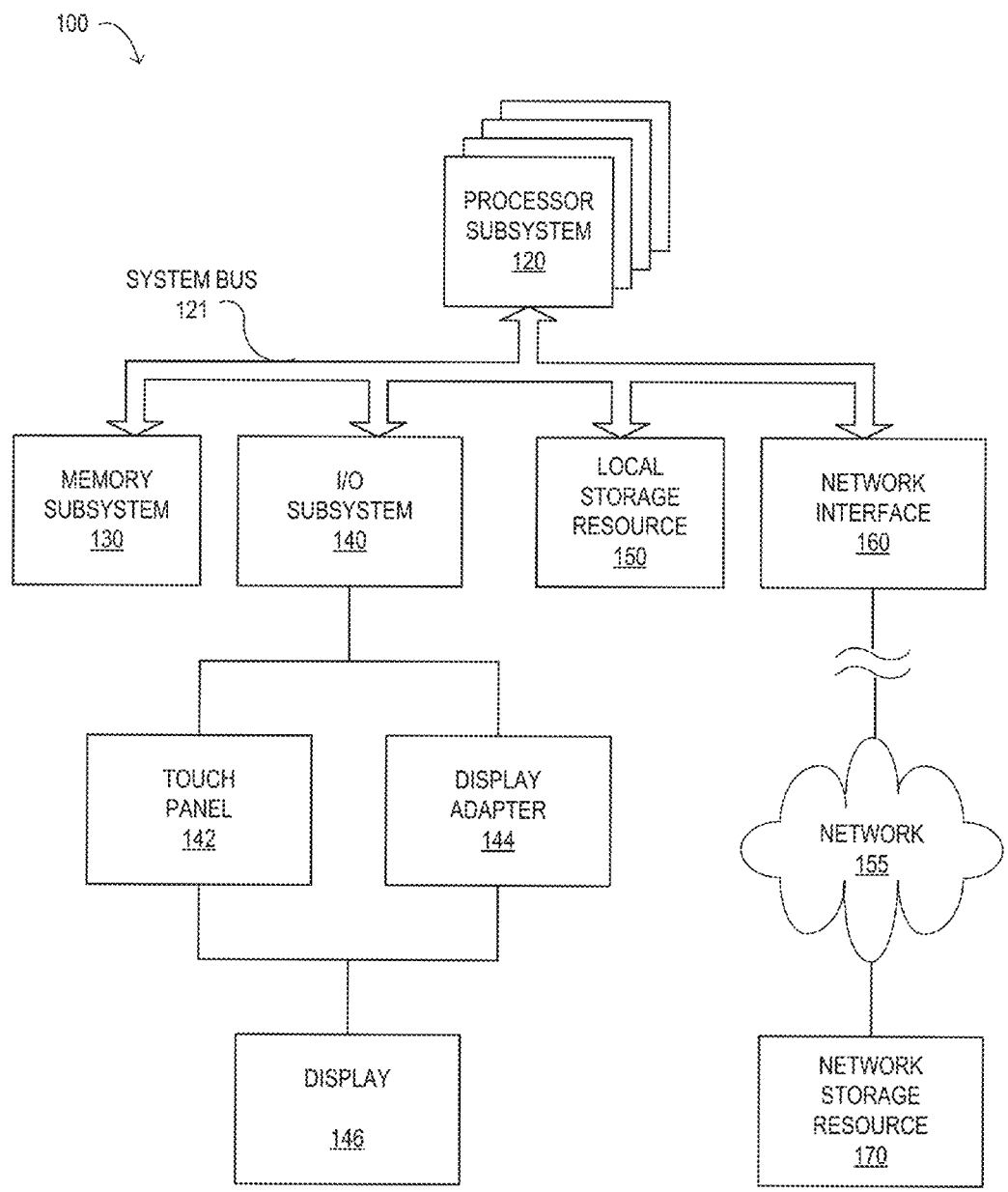
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, current information handling systems may demand ever increased power density and reductions of the size of power supplies, while increasing switching frequency of operation. In particular, power supplies including increased switching frequencies are being developed for information handling systems that utilize inductor-inductor-capacitor (LLC) topology resonant converters. As will be described in further detail, the inventors of the present disclosure have developed novel circuits and methods disclosed herein for enhancing peak power capabilities and hold-up time in LLC topology resonant converters. The disclosed LLC topology resonant converters have increased switching frequencies, extended hold-up times, and increased peak gains, while maintaining efficiency.

Particular embodiments are best understood by reference to FIGS. 1 through 7 wherein like numbers are used to indicate like and corresponding parts.

Turning now to the drawings, FIG. 1 illustrates a block diagram depicting selected elements of an embodiment of information handling system 100. As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to a network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display 146 that is driven by display adapter 144.

As will be described in further detail, information handling system 100, or certain components included therein, may be supplied power by one or more power supply units. The power supply units may supply current to power processor subsystem 120, memory subsystem 130, I/O subsystem 140, local storage resource 150, etc. A power supply unit may utilize a resonant converter having a LLC topology, as described in further detail below.

Figure 2:
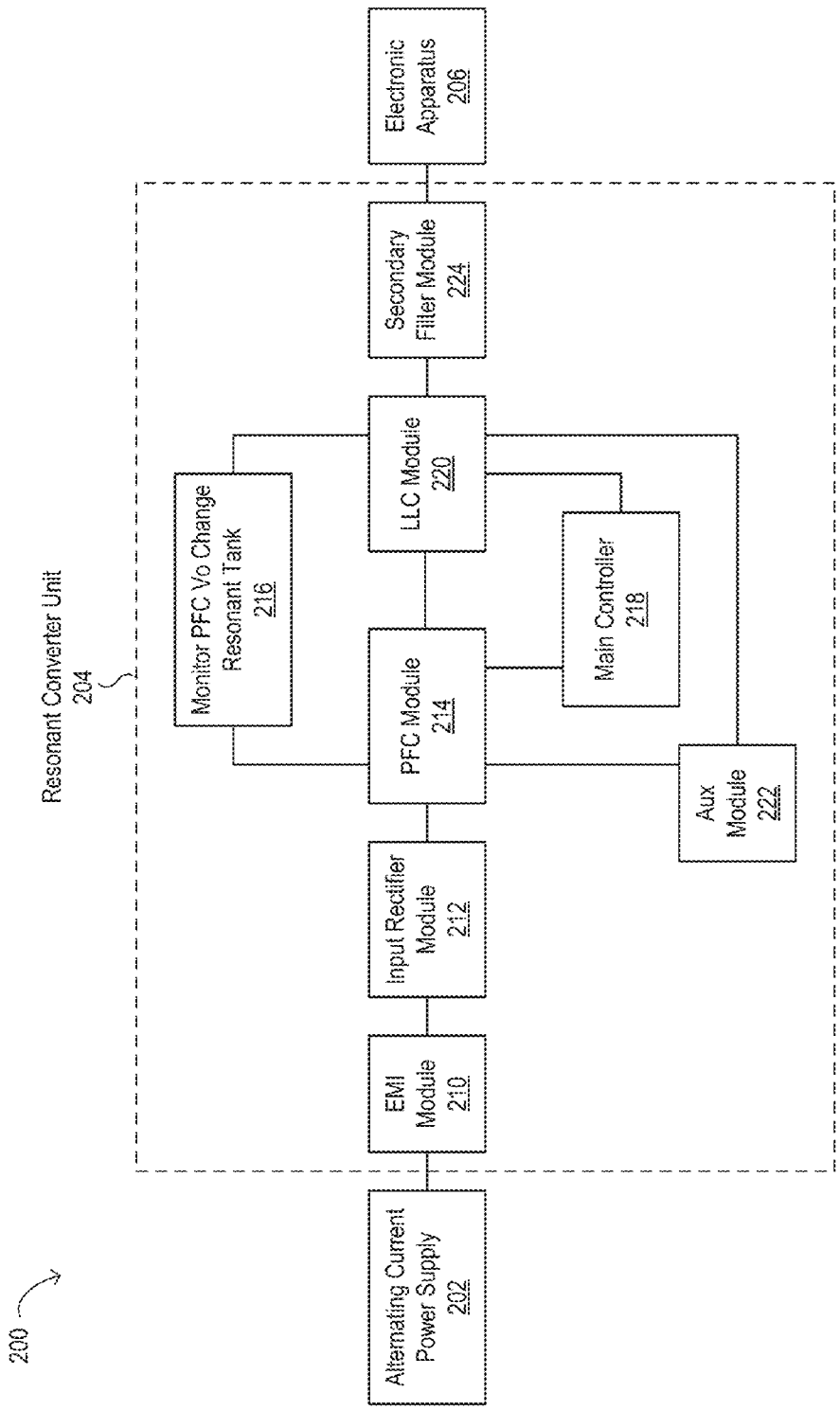
FIG. 2 is a block diagram of selected elements of an embodiment an information handling system including a LLC based resonant converter unit.

Turning now to FIG. 2, a block diagram of selected elements of an embodiment of an information handling system 200 including a LLC based resonant converter unit 204 is illustrated. In FIG. 2, information handling system 200 is shown in a schematic representation and is not drawn to scale or perspective. It is noted that, in different embodiments, information handling system 200 may be operated with additional or fewer elements.

As shown in FIG. 2, components of information handling system 200 may include, but are not limited to, an alternating current (AC) power supply unit 202, which may efficiently convert a higher-voltage supply (e.g., a battery or an external source) to a lower voltage suitable for use by other components, LLC based resonant converter unit 204 coupled to AC power supply unit 202, and an electronic apparatus 206 (e.g., a processor or a memory) coupled to LLC based resonant converter unit 204.

LLC based resonant converter unit 204 may include an electromagnetic interference (EMI) module 210 which may reduce the effects of EMI in LLC based resonant converter unit 204, an input rectifier module 212 to convert AC current to direct current (DC), a power failure condition (PFC) module 214, a monitor PFC Vo change resonant tank 216 to monitor an input voltage of LLC based resonant converter unit 204 and control a resonant tank having a LLC topology of a LLC module 220, LLC module 220 which may enhance peak power capability and hold up time, a main controller 218 which may control operation of LLC based resonant converter unit 204, an auxiliary module 222, and a secondary filter module 224 which may filter out undesirable frequencies in the switching frequency range of operation of LLC based resonant converter unit 204.

Monitor PFC Vo change resonant tank 216 may monitor the input voltage to detect a change in the input voltage that indicates an AC power failure has occurred. In response to detecting the change in the input voltage that indicates the AC power failure has occurred, monitor PFC Vo change resonant tank 216 may cause the resonant tank to increase a peak gain of LLC based resonant converter unit 204. The increase of the peak gain of LLC based resonant converter unit 204 may increase a hold-up time of the input voltage and may also increase a voltage range of the input voltage. LLC based resonant converter unit 204 enables improved hold-up time performance, reduced size of a bulk capacitor, reduced size of an AC adapter, while providing high efficiency operation, increased power density, and improved peak power performance without voltage regulation. LLC based resonant converter unit 204 maintains output voltage regulation utilizing its peak gain. A power supply utilizing LLC based resonant converter unit 204 may provide high efficiency, low noise and good thermal performance, in higher power AC adapters including 180 W, 240 W, and 330 W higher power AC adapters. Table 1, below, shows a comparison between a Flyback converter and LLC based resonant converter unit 204.

TABLE 1

Comparison of a Flyback converter to an LLC based resonant converter unit

| Specification | Traditional Flyback Converter (180 W) | LLC based Resonant Converter Unit (180 W) |
| --- | --- | --- |
| Average Efficiency >87% at 115 Vac Condition | 87.93% | 90.99% |
| Power Saving at no load <0.3 W@230 Vac | <0.2731 W | <0.2950 W |
| Case Temperature ΔT 35° C.~40 C. | ΔT 5° C. | ΔT <40° C. |
| ID Function follow HP | Yes | Yes |
| Case Size | 170 mm/85 mm/40 mm | 168 mm/70 mm/40.5 mm |
| Weight | 1026 g | 810 g |

As shown in Table 1, above, LLC based resonant converter unit (180 W) shows improvements in converter properties and capabilities including efficiency, power savings, case temperature ΔT, ID function follow HP, case size, and weight compared to a traditional Flyback converter (180 W).

Figure 3:
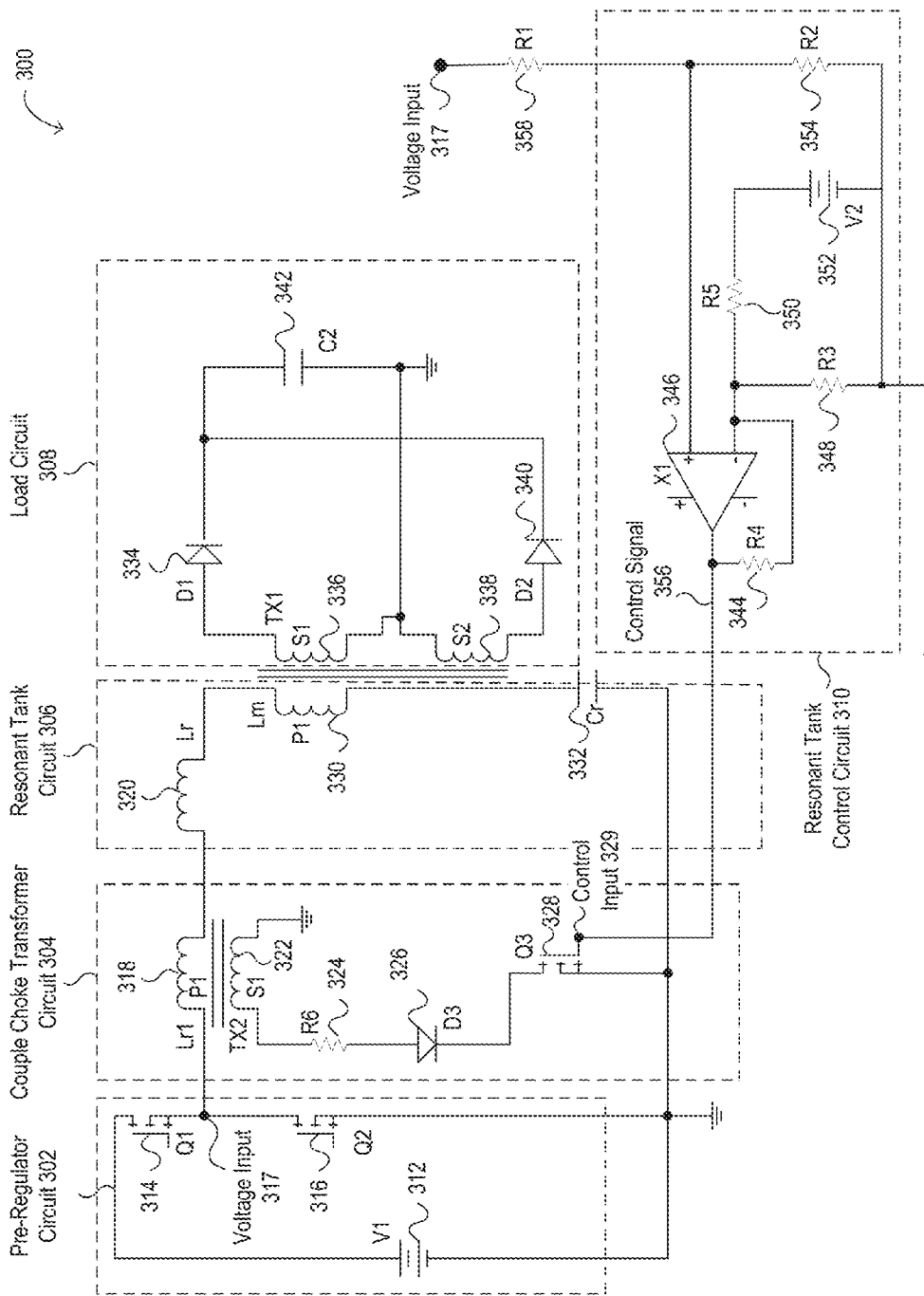
FIG. 3 is a circuit diagram of selected elements of an embodiment of a resonate converter having a LLC topology.

Turning now to FIG. 3, a circuit diagram of selected elements of an embodiment of a resonant converter 300 having a LLC topology is illustrated. In FIG. 3, resonate converter 300 is shown in a schematic representation and is not drawn to scale or perspective. It is noted that, in different embodiments, resonant converter 300 may be operated with additional or fewer elements.

Resonant converter 300 having the LLC topology may include a pre-regulator circuit 302, a couple choke transformer circuit 304, a resonant tank circuit 306, a load circuit 308, and a resonant tank control circuit 310. Pre-regulator circuit 302 may provide an input voltage at voltage input 317 of couple choke transformer circuit 304 and may include a rectifier 314 coupled between voltage input 317 and a voltage source 312 V1, and a rectifier 316 coupled between voltage input 317 and ground.

Couple choke transformer circuit 304 may include a couple choke transformer 318 having a primary side P1 coupled between voltage input 317 and resonant tank circuit 306 and a secondary side 322 S1 coupled between ground and a resistor 324 R6. Couple choke transformer circuit 304 may also include a diode 326 coupled to resistor 324 and to a rectifier 328. Rectifier 328 having a control input may be coupled to ground. Resistor 324 may provide a DC bias current through diode 326 and rectifier 328 to limit a resonant current of resonant tank circuit 306.

Resonant tank circuit 306 may include a leakage inductor 320 Lr coupled between the primary side of couple choke transformer 318 and a magnetizing inductance transformer 320, and a capacitor 332 Cr coupled between magnetizing inductance transformer 320 and ground. Load circuit 308 may include a first secondary side 336 S1 of magnetizing inductance transformer 320 coupled between a diode 334 and ground, a second secondary side 338 S2 of magnetizing inductance transformer 320 coupled between ground and a diode 340, and a capacitor 342 coupled between diodes 334 and 340 and ground. In this configuration, couple choke transformer 318 may be coupled in series with leakage inductor 320 Lr across resonant tank circuit 306.

Resonant tank control circuit 310 may include resistors 358 R1, 354 R2, 348 R3, 344 R4, and 350 R5, a voltage source 352 V2, and an amplifier 346 X1. Resonant tank control circuit 310 components may be configured to monitor voltage input 317 via resistor 358 R1 to detect a change in the input voltage at voltage input 317 that indicates an AC power failure has occurred. Resonant tank control circuit 310 may also be configured to drive a control signal at control input 329 to control couple choke transformer circuit 304 of resonant converter 300.

Couple choke transformer 318 and resonant tank circuit 306 appear in series with load circuit 308 via magnetizing inductance transformer 320. In this configuration, couple choke transformer 318 and resonant tank circuit 306, and load circuit 308 may act as a voltage divider. By changing the frequency of the input voltage at voltage input 317, impedance of couple choke transformer 318 and resonant tank circuit 306 may change. This impedance may divide the input voltage with a load condition of load circuit 308. Since it is acting as a voltage divider, the DC gain may be lower than one. At resonant frequency, the impedance may be at its lowest point. At resonance the amount of voltage at load circuit 308 may be nearly the amount of the input voltage and the peak gain may happen at resonant frequency. The DC characteristic of resonant converter 300 having the LLC topology may be divided into a zero voltage switch region and a zero current switch region. For resonant converter 300, there are two resonant frequencies. The first resonant frequency may be determined by resonant components couple choke transformer 318 Lr1, leakage inductor 320 Lr, and capacitor 332 Cr. The second resonant frequency may be determined by the resonant components couple choke transformer 318 Lr1, leakage inductor 320 Lr, and capacitor 332 Cr, and the load condition of load circuit 308. As the load condition increases, the resonant frequency will shift to a higher frequency.

The voltage range of the input voltage at voltage input 317 is provided by pre-regulator circuit 302. The maximum input voltage to couple choke transformer circuit 304 is the nominal output voltage at capacitor 342 C2 of load circuit 308. Even though the input voltage is regulated as a constant by pre-regulator circuit 302, during an AC power failure, the input voltage drops and the resonant converter 300 may need to maintain the input voltage within a regulation voltage range for a desired hold-up time to meet hold-up time expectations. During an AC power failure, resonant converter 300 may increase peak gain and the voltage range of the input voltage to extend the hold-up time. During peak power condition, resonant converter 300 may increase peak gain to allow operation at the peak power condition.

Figure 4:
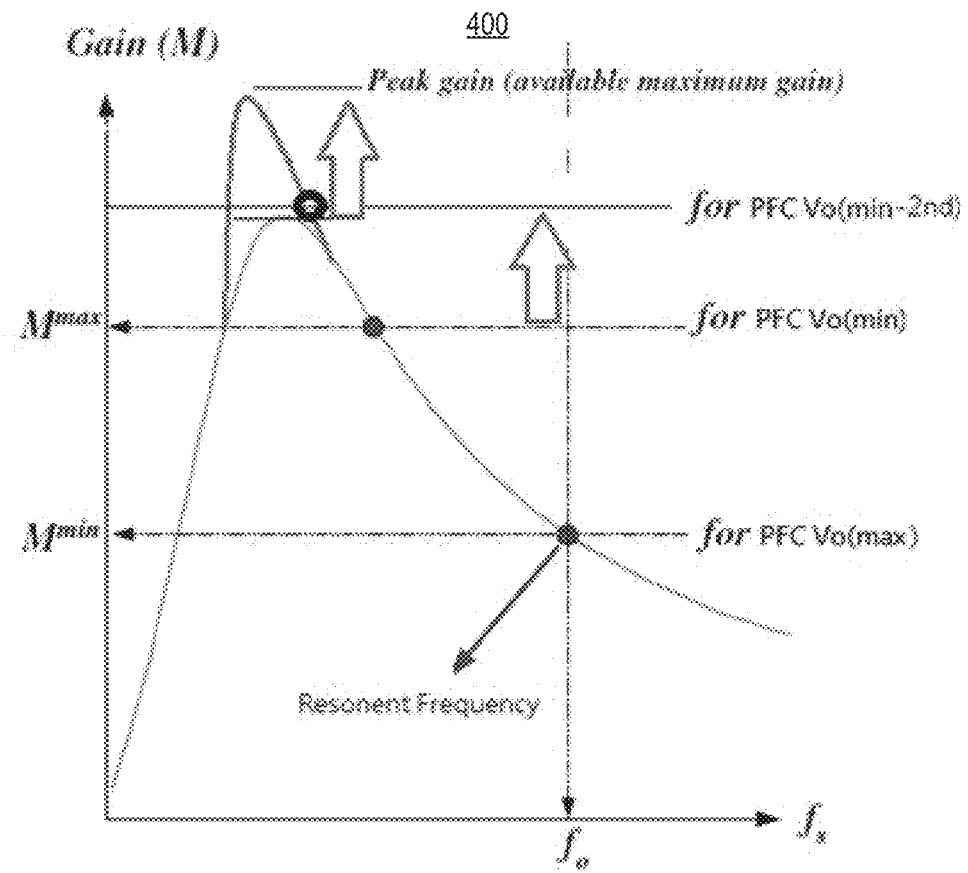
FIG. 4 is a graph illustrating increased voltage range of an input voltage for selected elements of an embodiment of a resonate converter having a LLC topology.

Referring to FIG. 4, a graph 400 illustrating an increased voltage range of an input voltage for selected elements of an embodiment of a resonate converter. e.g. resonant convert 300, having a LLC topology. Graph 400 shows the peak gain curve, where a maximum available peak gain has increased from a peak gain of another resonant converter circuit without couple choke transformer circuit 304, while the second resonant frequency, labeled $f_o$ in graph 400 has been decreased. Graph 400 also shows another voltage range of input voltage of the other resonant converter circuit from the increased voltage range of the input voltage from a maximum input voltage value, labeled as PFC Vo(max), to a minimum voltage value, labeled as PFC Vo(min). Graph 400 further shows the increased voltage range of the input voltage of resonant converter 300 from the maximum input voltage value, PFC Vo(max), to a minimum voltage value, labeled as PFC Vo(min-2nd).

Referring back to FIG. 3, during normal operation of resonant converter 300, resonant current flows through couple choke transformer 318 of couple choke transformer circuit 304 and leakage inductor 320 Lr, magnetizing inductance transformer 320 Lm, and capacitor 332 Cr of resonant tank circuit 306. When resonant tank control circuit 310 detects that the input voltage at voltage input 317 may indicate that the input voltage is not changing and is at a normal operating value, resonant tank control circuit 310 may drive control input 329 to turn off rectifier 328 so that couple choke transformer circuit 304 and resonant tank circuit 306, along with resonant converter 300, operate in normal operation mode. In normal operation of resonant converter 300, couple choke transformer 318 works together in series with leakage inductor 320.

Figure 5:
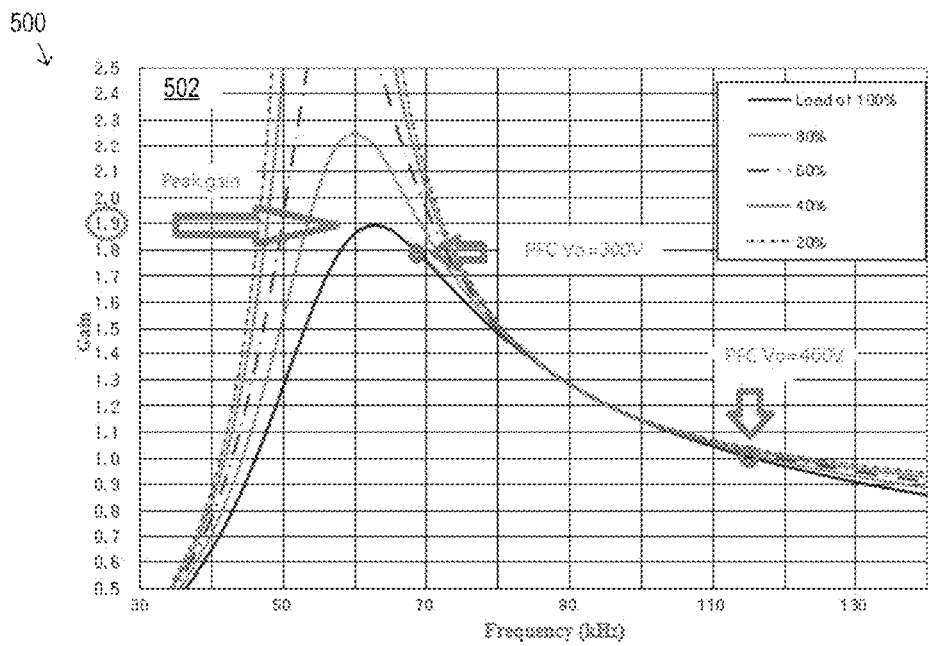
FIG. 5 are graphs illustrating peak gain curves for selected elements of an embodiment of a resonate converter having a LLC topology.
Figure 5:
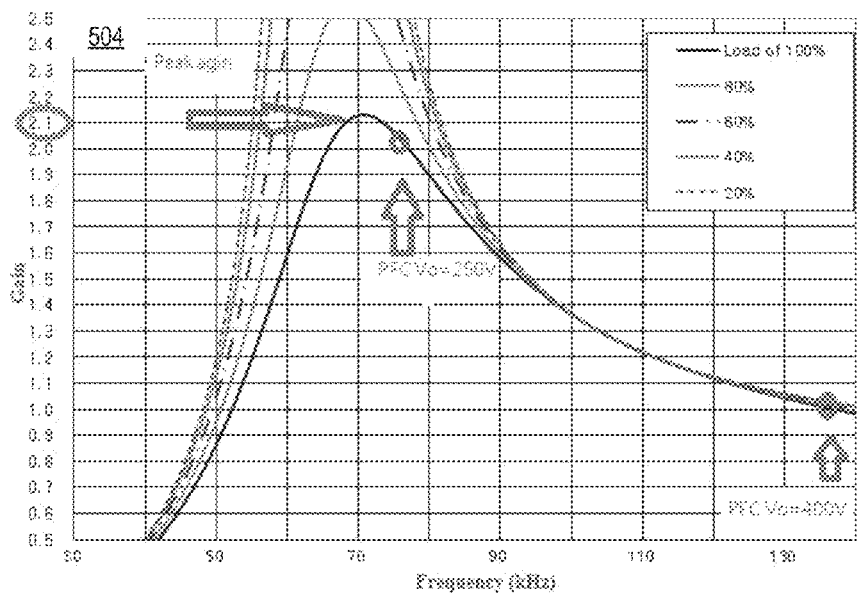

In an exemplary embodiment, inductance of couple choke transformer 318 may be set to 80 µH, inductance of leakage inductor 320 Lr may be set to 220 µH, capacitance of capacitor 322 may be set to 10 nF, inductance of magnetizing inductance transformer 320 Lm may be set to 611 µH, and bulk capacitance of capacitor 342 may be set to 220 uF to drive a 130 W AC adapter with LLC topology. Referring to FIG. 5, a graph 502 illustrates peak gain curves for selected elements of an embodiment of a resonate converter, e.g. resonant convert 300, having a LLC topology. Graph 502 shows a peak gain curve, labeled Load of 100%, with a peak gain of 1.9 for resonant converter 300 operating at a maximum load condition. Graph 502 also shows a value of 400V for the maximum input voltage value, labeled as PFC Vo=400V, and a value of 300V for the minimum input voltage value, labeled as PFC Vo=300V. According to a hold-up time equation 506 of FIG. 5, resonant converter 300, in the exemplary embodiment, has a hold-up time performance of 59.23 mS.

Referring back to FIG. 3, during peak power operation of resonant converter 300, detected by resonant tank control circuit 310, resonant tank control circuit 310 may drive control input 329 to turn on rectifier 328. In response to the control input being driven to turn on rectifier 328, the primary side of couple choke transformer 318 may be shorted causing the inductance of couple choke transformer 318 to become a zero inductance value. The primary side of couple choke transformer 318 may be shorted by rectifier 328, diode 326, and resistor 324. When the inductance of couple choke transformer 318 becomes the zero inductance value, the peak gain of resonant tank 300 is increased. The addition of couple choke transformer circuit 304 to resonant circuit 300 may also improve power efficiency of resonant circuit 300.

During an AC power failure, the input voltage at voltage input 317 of resonant circuit 300 will start linearly decreasing, over a time period, from a maximum input voltage value to a minimum input voltage value before a different peak gain curve for resonant converter 300 having the LLC topology is established. Resonant tank control circuit 310 may detect a change in the input voltage at voltage input 317 that may indicate that an AC power failure has occurred. In response, resonant tank control circuit 310 may drive control input 329 to turn on rectifier 328 so that resonant converter 300 operates in a power failure mode. In response to control input 328 being driven to turn on rectifier 328, the primary side of couple choke transformer 318 may be shorted causing the inductance of couple choke transformer 318 to change and may become a zero inductance value. During this time period, the resonant current of resonant converter 300 may go through leakage inductance 320 Lr, magnetizing inductance transformer 330 Lm, and capacitor 332 Cr. As a result, the peak gain of resonant converter 300 having the LLC topology may be increased and the input voltage at voltage input 317 may continue to be regulated until the input voltage is no longer on the peak gain curve. Couple choke transformer circuit 304 may also extend the hold-up time of the input voltage and may increase voltage range of the input voltage at voltage input 317, resulting in improved efficiency and peak power delivery.

Referring back to FIG. 5, in the exemplary embodiment described above, graph 504 shows a new peak gain curve, labeled Load of 100%, with a new peak gain of 2.1 for resonant converter 300 operating in AC power failure mode. Graph 504 also shows a value of 400V for the maximum input voltage value, labeled as PFC Vo=400V, and a new value of 250V for the minimum input voltage value, labeled as PFC Vo=250V, increasing the voltage range of the input voltage by an additional 50V. According to hold-up time equation 506, the hold-up time performance of resonant circuit 300 operating in AC power failure mode is 82.5 mS, an increase of 23.27 mS in the hold-up time performance of resonant circuit 300 operating in normal operation mode. Bulk capacitance may also be reduced to reduce costs of resonant circuit 300 without sacrificing efficiency and function.

Figure 6:
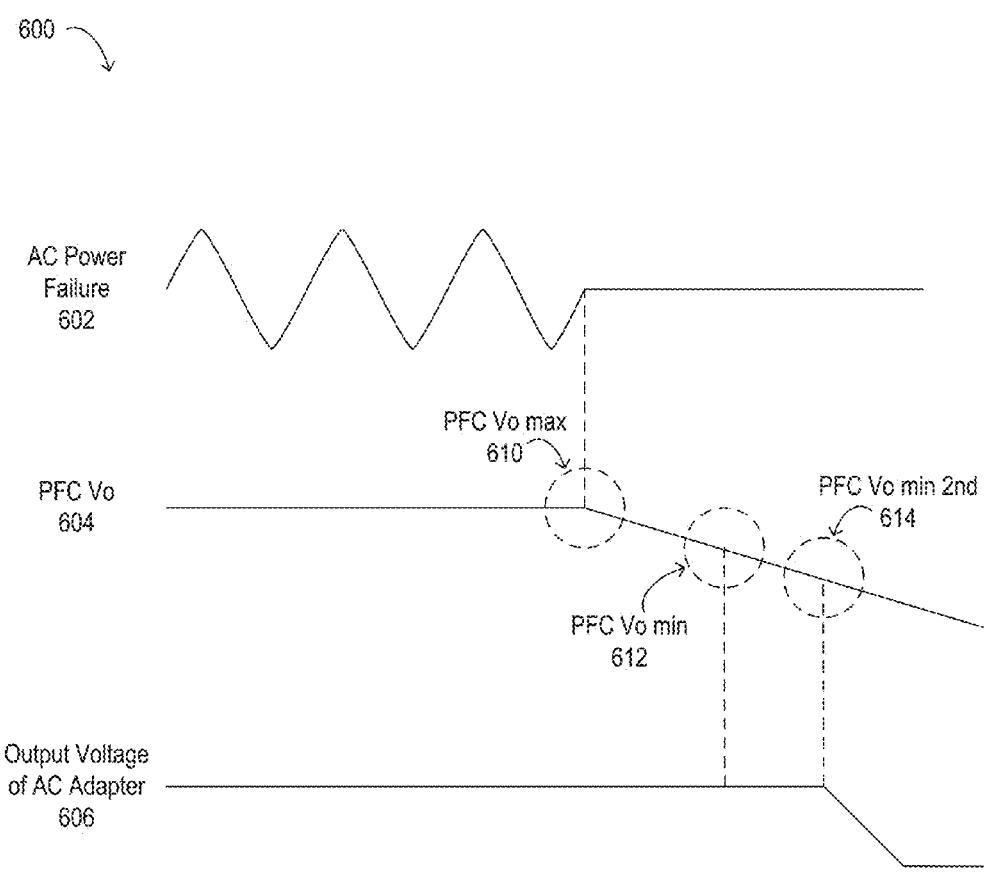
FIG. 6 is a timing chart for selected elements of an embodiment of a resonate converter having a LLC topology.

Referring to FIG. 6, a timing chart 600 for selected elements of an embodiment of a resonant converter, e.g. resonant converter 300, having a LLC topology is illustrated. Timing chart 600 shows the input voltage, AC Power Failure 602, during an AC power failure, the input voltage 604, PFC Vo 604, of voltage input 317 of resonant converter 300, and the output voltage of the AC adapter, and Output Voltage of AC adapter 606. Timing chart 600 also shows the maximum input voltage value for resonant converter 300, PFC Vo max 610, at the time of the AC power failure, a minimum input voltage value for another resonant converter different than, PFC Vo min 612, and a minimum input voltage value for resonant converter 300, PFC Vo min 614. The other resonant converter is different than resonant converter 300. Timing chart 600 also shows that the voltage range of input voltage of resonant converter 300 having LLC topology has been increased.

Table 2, below, shows peak power performance for a resonant converter having a LLC topology and the delta difference from another different resonant converter.

TABLE 2

Peak Power Performance for a Resonant Converter having a LLC Topology and the Delta Difference from another Different Resonant Converter

| Model | State | Peak Current (Vo >= 18 V) | | | | |
|---|---|---|---|---|---|---|
| | | 500 μs | 1 ms | 5 ms | 10 ms | 50 ms |
| E4 180W (19.5 V/9.23 A) | Delta | 16.6 A | 16.1 A | | 13.9 A | — |
| | Resonant Converter having LLC topology | 19.3 V | 19.2 V | | 19.2 V | |
| E4 240W (19.5 V/12.3 A) | Delta | 20.3 A | 19.7 A | | 18.5 A | — |
| | Resonant Converter having LLC topology | 19.5 V | 19.3V | | 19.2 V | |
| E4 330W(19.5 V/16.92 A) | Delta | 29.6 A | 29.4 A | 28.3 A | 26.7 A | — |
| | Resonant Converter having LLC topology | 19.6 V | 19.5 V | | 19.4 V | |

As shown in table 2, the peak power performance of the resonant converter having the LLC topology shows improvement over the other resonant converter.

Figure 7:
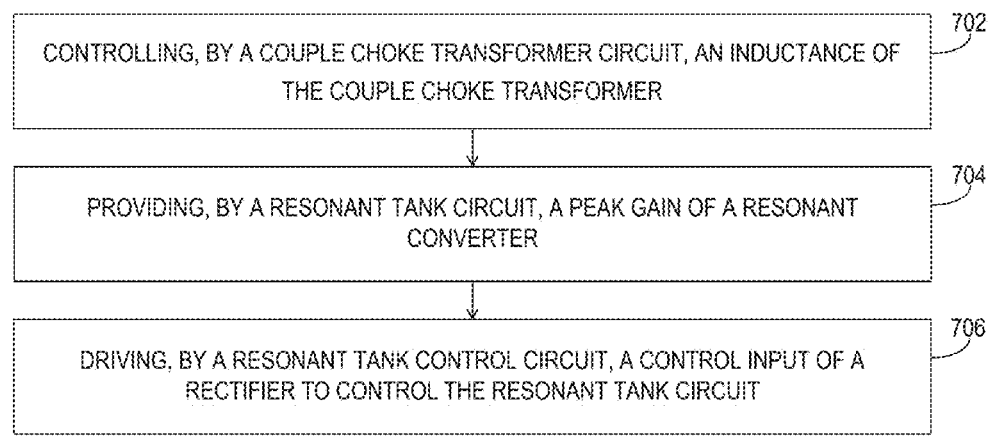
FIG. 7 is flowchart depicting selected elements of an embodiment of a method for enhancing peak power capability and hold-up time in an embodiment of a resonate converter having a LLC topology.

Referring now to FIG. 7, a block diagram of selected elements of an embodiment of a method for enhancing peak power capability and hold-up time in an embodiment of a resonate converter having a LLC topology (such as resonant converter 300) is depicted in flowchart form. It is noted that certain operations described in method 700 may be optional or may be rearranged in different embodiments.

The resonant converter may include a couple choke transformer circuit including a couple choke transformer including a primary side and a secondary side, the primary side coupled to a voltage input, and the secondary side coupled between a resistor and ground, a diode coupled to the resistor, and a rectifier coupled between the diode and ground. The resonant converter may also include a resonant tank circuit including a leakage inductor coupled to the primary side of the couple choke transformer, a magnetizing inductance transformer coupled to the leakage inductor, and a capacitor coupled between the magnetizing inductance transformer and ground. The resonant converter may further include a resonant tank control circuit coupled to the voltage input of the couple choke transformer circuit via a second resistor.

Method 700 may begin at 702, controlling, by the couple choke transformer circuit, an inductance of the couple choke transformer. At step 704, providing, by the resonant tank circuit, a peak gain of the resonant converter. At step 706, driving, by the resonant tank control circuit, a control input of the rectifier to control the resonant tank circuit.

As disclosed herein, methods for enhancing peak power capability and hold-up time in a resonant converter having a LLC topology include controlling, by the couple choke transformer circuit, an inductance of the couple choke transformer to improve power efficiency and improve peak gain of the resonant converter. The methods also include providing, by the resonant tank circuit, a peak gain of the resonant converter to provide improved peak power delivery. The methods further include driving, by the resonant tank control circuit, a control input of the rectifier to control the resonant tank circuit to increase the peak gain of the resonant converter, increase the voltage range of input voltage, and extend the hold-up time of the input voltage when an AC power failure occurs. This allows smaller input capacitors to be utilized and AC adapter size to be reduced without the need to sacrifice high performance efficiency to meet longer hold-up times, peak power demands, while maintaining the high performance of the LLC topology of the resonant tank.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A resonant converter, comprising:
    a couple choke transformer circuit including:
        a couple choke transformer including a primary side and a secondary side;
        a resistor;
        a diode; and
        a rectifier including a control input, the couple choke transformer circuit to control an inductance of the couple choke transformer;
    a resonant tank circuit including:
        a leakage inductor;
        a magnetizing inductance transformer including a primary side and a secondary side; and
        a capacitor, the resonant tank circuit to provide a peak gain of the resonant converter; and
    a resonant tank control circuit coupled to a voltage input of the couple choke transformer circuit via a second resistor, the resonant tank control circuit coupled to drive the control input of the rectifier to control the resonant tank circuit,
    the primary side of the couple choke transformer connected to the voltage input, the secondary side of the couple choke transformer connected between the resistor and ground, the diode connected between the resistor and the rectifier, the rectifier connected between the diode and ground, the leakage inductor connected between the primary side of the couple choke transformer and the primary side of the magnetizing inductance transformer, and the capacitor connected between the primary side of the magnetizing inductance transformer and ground.

2. The resonant converter of claim 1, the resonant tank control circuit further to:

detect a change in an input voltage at the voltage input that indicates an alternating current (AC) power failure has occurred; and drive the control input to turn on the rectifier to change the inductance of the couple choke transformer.

3. The resonant converter of claim 1, the couple choke transformer circuit further to:

in response to the control input being driven to turn on the rectifier, the primary side of the couple choke transformer is shorted to cause the inductance of the couple choke transformer to become a zero inductance value.

4. The resonant converter of claim 1, the couple choke transformer circuit further to:

in response to the control input being driven to turn on the rectifier, the primary side of the couple choke transformer is shorted by the rectifier, the diode and the resistor to cause the inductance of the couple choke transformer to become a zero inductance value.

5. The resonant converter of claim 1, the couple choke transformer circuit further to:

in response to the control input being driven to turn on the rectifier, a peak gain of the resonant converter is increased.

6. The resonant converter of claim 1, the couple choke transformer circuit further to:

in response to the control input being driven to turn on the rectifier, a hold-up time of an input voltage at the voltage input is increased.

7. The resonant converter of claim 1, the couple choke transformer circuit further to:

in response to the control input being driven to turn on the rectifier, a voltage range of an input voltage at the voltage input is increased.

8. The resonant converter of claim 1, the couple choke transformer circuit further to:

in response to the control input being driven to turn off the rectifier, a peak gain of the resonant converter is changed.

9. The resonant converter of claim 1, the resistor to:

provide a direct current (DC) bias current through the diode and the rectifier to limit a resonant current of the resonant tank circuit.

10. A method for enhancing peak power capabilities and hold-up time, the method comprising:

in a resonant converter comprising:
 a couple choke transformer circuit including:
  a couple choke transformer including a primary side and a secondary side;
  a resistor;
  a diode; and
  a rectifier including a control input;
 a resonant tank circuit including:
  a leakage inductor;
  a magnetizing inductance transformer including a primary side and a secondary side; and
  a capacitor; and
 a resonant tank control circuit coupled to a voltage input of the couple choke transformer circuit via a second resistor, the primary side of the couple choke transformer connected to the voltage input, the secondary side of the couple choke transformer connected between the resistor and ground, the diode connected between the resistor and the rectifier, the rectifier connected between the diode and ground, the leakage inductor connected between the primary side of the couple choke transformer and the primary side of the magnetizing inductance transformer, and the capacitor connected between the primary side of the magnetizing inductance transformer and ground, controlling, by the couple choke transformer circuit, an inductance of the couple choke transformer;

providing, by the resonant tank circuit, a peak gain of the resonant converter; and driving, by the resonant tank control circuit, the control input of the rectifier to control the resonant tank circuit.

11. The method of claim 10, further comprising:

detecting, by the resonant tank control circuit, a change in an input voltage at the voltage input that indicates an AC power failure has occurred; and driving the control input to turn on the rectifier to change an inductance of the couple choke transformer.

12. The method of claim 10, further comprising:

shorting, by the couple choke transformer circuit, in response to the control input being driven to turn on the rectifier, the primary side of the couple choke transformer to cause the inductance of the couple choke transformer to become a zero inductance value.

13. The method of claim 10, further comprising:

shorting, by the rectifier, the diode and the resistor, in response to the control input being driven to turn on the rectifier, the primary side of the couple choke transformer to cause the inductance of the couple choke transformer to become a zero inductance value.

14. The method of claim 10, further comprising:

increasing, in response to the control input being driven to turn on the rectifier, a peak gain of the resonant converter.

15. The method of claim 10, further comprising:

increasing, in response to the control input being driven to turn on the rectifier, a hold-up time of an input voltage at the voltage input.

16. The method of claim 10, further comprising:

increasing, in response to the control input being driven to turn on the rectifier, a voltage range of an input voltage at the voltage input.

17. The method of claim 10, further comprising:

changing, in response to the control input being driven to turn off the rectifier, a peak gain of the resonant converter.

18. The method of claim 10, further comprising:

providing, by the resistor, a DC bias current through the diode and the rectifier to limit a resonant current of the resonant tank circuit.

\* \* \* \* \*